United States Patent
Ranta

(10) Patent No.: US 6,339,697 B1
(45) Date of Patent: Jan. 15, 2002

(54) SETTING SERVICE LEVEL IN DIGITAL MOBILE COMMUNICATION SYSTEM

(75) Inventor: Pekka Ranta, Nummela (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/254,245

(22) PCT Filed: Sep. 2, 1997

(86) PCT No.: PCT/FI97/00513

§ 371 Date: Apr. 12, 1999

§ 102(e) Date: Apr. 12, 1999

(87) PCT Pub. No.: WO98/10615

PCT Pub. Date: Mar. 12, 1998

(30) Foreign Application Priority Data

Sep. 3, 1996 (FI) .................................................. 963454

(51) Int. Cl.⁷ .............................................. H04B 15/00
(52) U.S. Cl. ........................... 455/63; 455/69; 455/561
(58) Field of Search ........................... 455/69, 522, 63, 455/67.1, 423, 453, 561, 560, 517; 370/342; 375/148, 140

(56) References Cited

U.S. PATENT DOCUMENTS

| 4,435,840 A | | 3/1984 | Kojima et al. | |
|---|---|---|---|---|
| 5,230,003 A | | 7/1993 | Dent et al. | |
| 5,267,262 A | * | 11/1993 | Wheatley, III | 455/69 |
| 5,574,984 A | * | 11/1996 | Reed et al. | 455/69 |
| 5,734,967 A | * | 3/1998 | Kotzin et al. | 455/63 |
| 5,857,147 A | * | 1/1999 | Gardner et al. | 455/63 |

FOREIGN PATENT DOCUMENTS

| EP | 0 505 341 | 9/1992 |
|---|---|---|
| EP | 0 615 395 | 9/1994 |
| WO | WO 93/15591 | 8/1993 |
| WO | WO 95/07578 | 3/1995 |
| WO | WO 95/12257 | 5/1995 |
| WO | WO 95/26598 | 10/1995 |
| WO | WO 96/03813 | 2/1996 |

OTHER PUBLICATIONS

Mouley, et al., *The GSM System for Mobile Communications*, 1992.

A photocopy of the International Search Report for PCT/FI97/00513.

* cited by examiner

*Primary Examiner*—Nguyen T. Vo
(74) *Attorney, Agent, or Firm*—Altera Law Group, LLC

(57) ABSTRACT

The invention relates to a method for setting a service level in a digital mobile communication system, and to a digital mobile communication system. The method of the invention is characterized in that a network interference load is defined and network parameters or, in connection with the establishment of a connection, transmission parameters are set at a base station and in a mobile station according to the network interference load. The invention further relates to a mobile communication system.

7 Claims, 3 Drawing Sheets

SETTING SERVICE LEVEL IN DIGITAL MOBILE COMMUNICATION SYSTEM

FIELD OF THE INVENTION

The invention relates to a method for setting a service level in a digital mobile communication system, and to a digital mobile communication system.

BACKGROUND OF THE INVENTION

The quality of the service offered to a mobile communication subscriber within a mobile communication network is determined by the joint effect of several factors. In the present application quality of service is understood to mean the technical quality of a radio connection, e.g. the transmission rate and the accuracy of the information transmitted, and the accessibility of the radio channel at a desired moment. The term service level is used to refer to the level of the above quality of service.

Within a digital data communication system, transmission errors deteriorating the quality of the signal transmitted occur on a transmission path during speech or data transmission. On the radio path transmission errors occur when a signal encounters interference e.g. due to multipath propagation, an interference signal or a high level of background noise. Channel coding of the digital signal to be transmitted improves the quality of transmission and the tolerance for transmission errors. In channel coding, redundancy is added to a coded speech or data bit sequence by means of error check bits calculated from the original signal. In a receiver, channel coding is decoded in a channel decoder, which allows using error check bits for detecting or even correcting errors occurring during transmission.

Channel coding increases the number of bits transmitted. For instance, when error check bits with a transmission rate of 9.8 kbit/s are added to a full rate speech signal of 13 kbit/s in a GSM system, the total transmission rate is 22.8 kbit/s. The level of protection provided by channel coding is arranged according to need. For rapid transmission of a large quantity of data, channel coding is reduced in order to allow more payload data to be transmitted on the transmission channel. Channel coding may be arranged to detect well and also to correct errors occurring during transmission, or to detect errors only. Channel coding may also be left out altogether. In this case the transmission is totally unprotected against transmission errors. In the GSM system, the bits to be transmitted are classified according to their significance into different groups, where channel coding is effected at a predetermined level. The problem with this solution is that efficient channel coding of the most important bits always reserves transmission capacity on the radio path. Transmission errors do not always occur during transmission. In such cases channel coding has unnecessarily blocked radio channels. On the other hand, unprotected high-speed information transmission causes problems in an environment subject to interference.

FIG. 1 of the attached drawing presents a simplified block diagram of the Pan-European GSM mobile communication system. A Mobile Station MS is connected over the radio path to a Base Transceiver Station BTS, which in the case of FIG. 1 is base station BTS1. A Base Station System BSS comprises a Base Station Controller BSC and base stations BTS controlled by it. Usually a Mobile Services Switching Centre MSC controls several base station controllers BSC. A mobile services switching centre MSC has an interface to other mobile services switching centres and, via a Gateway Mobile Services Switching Centre GMSC, to a public telephone network. The operation of the whole system is controlled by an Operation and Maintenance Centre OMC. Subscriber information concerning a mobile station MS is permanently stored in the system's Home Location Register HLR and temporarily in a Visitor Location Register VLR within the area of which the mobile station MS is currently located.

Cellular mobile communication systems use several slightly over-lapping radio cells for producing radio coverage. In radio network planning, cell coverage in areas requiring high traffic capacity is arranged by means of small micro cells. As a mobile station MS moves from one cell to another, handover to a new radio cell is performed on the basis of specific handover criteria. The aim is to perform handover with minimum interference to the call in progress. However, problems arise with micro cells with small cell coverage; in them, handover must be performed fairly frequently, which increases the risk of failure in handover.

The mobile station MS and the base transceiver station BTS serving it continuously measure the level and the quality of the signal on a radio connection, for instance in case of any handover or power adjustment. The mobile station MS measures the signals from the base station BTS serving it and from the base stations BTS closest to its area of location, regularly transmitting the results of the measurement as a report message through the base transceiver station BTS serving it to the base station controller BSC. A base station BTS performs measurements of the level and quality of the signal on ongoing radio connections and possibly also other measurements indicating the general level of interference in the network.

When the level and/or quality of the signal on an individual radio connection drops below the desired level, adjustment of the transmission power can be performed at a base station BTS or/and in a mobile station MS for improving the radio connection. The transmission power of the mobile station MS is usually adjusted from a fixed network by means of a specific power adjustment algorithm. The mobile station MS measures the reception level (field strength) and the quality of a downlink signal received from the base station BTS1 of the cell serving it, and the base station BTS1 of the cell serving the MS in turn measures the reception level (field strength) and the quality of an uplink signal received from the mobile station MS. On the basis of these measurement results and the power adjustment parameters set, a power adjustment algorithm defines a suitable level of transmission power which is then announced to the mobile station MS in a power adjustment command. Power is adjusted continuously during the call. The problem with increasing transmission power is that it increases the level of interference in the network, for which reason the transmission power is to be kept as low as possible.

In digital Time Division Multiple Access TDMA radio systems, a group of mobile stations MS can use on a time-division basis the same carrier frequency, or radio channel, for communicating with a base station BTS. The carrier wave has been divided into successively recurring frames which are further divided into time slots, e.g. into eight time slots which are allocated to users according to need. Short data bursts are transmitted in the time slots. From the point of view of the network, eight traffic channels, for instance, can thus be created on a single carrier wave.

In a conventional TDMA system, each mobile station is allocated one traffic channel time slot for data transmission. According to the available bandwidth and the channel coding used in transmission, the maximum transmission rate on a single traffic channel is restricted at a fairly low level, being 9.6 kbit/s or 12 kbit/s in a GSM system. During the past few years, need for high-speed data services in mobile communication networks has increased significantly. One way of increasing transmission rate is to use more than one channel pair, which means that several TDMA time slots in a frame are allocated for a single mobile station. At the transmission end, a high-speed data signal is divided between such parallel channels for the duration of the transfer over the radio path, and then coded again at the receiving end. This enables offering data transmission services with a multiple transmission rate, depending on the number of channels used, as compared with the conventional transmission rate.

The operation of a Code Division Multiple Access CDMA in radio systems is based on spread-spectrum transmission. The data signal to be transmitted is multiplied by a subscriber specific spreading code, which spreads the transmission on a broadband radio channel, which is typically 1.25 MHz. This allows several users to send simultaneously on the same broadband radio channel CDMA signals processed with different spreading codes. At the receiving end the CDMA signal is decoded with a subscriber spreading code, which produces a narrowband data signal. The broadband signals of the other subscribers appear as noise in the receiver as compared with the signal desired. In a CDMA system a subscriber specific spreading code thus produces a system traffic channel in the same sense as a time slot in TDMA systems. In CDMA systems data transmission rate can also be increased by allocating several traffic channels, or spreading codes, to the sub-scriber.

The problem with rapid transmission using several traffic channels is that it reserves an extensive amount of transmission capacity in a cell. If several subscribers using rapid data transmission are simultaneously in a network cell, access to the network by ordinary users may be blocked due to cell overload.

BRIEF DESCRIPTION OF THE INVENTION

The aim of the present invention is to provide a mobile station in a digital data communication system with a service level needed, without interfering with the normal operation of the network.

Setting of this new type of service level is achieved by a method of the invention which is characterized in that a network interference load is defined and that, in connection with the establishment of a connection, transmission parameters are set at a base station and in a mobile station according to the network interference load.

The invention further relates to a method for setting a service level in a digital mobile communication system, the method being characterized in that a network interference load is defined and network parameters are set according to the network interference load.

An object of the invention is also to provide a digital mobile communication system which is characterized in that it comprises means for defining network interference load; means for defining transmission parameters for a connection in response to the network interference load; means for setting transmission parameters at a base station in response to the output of said means defining the transmission parameters; and means for setting transmission parameters in a mobile station in response to the output of said means defining the transmission parameters.

The invention further relates to a digital mobile communication system which is characterized in that it comprises means for defining network interference load and means for setting network parameters in response to the network interference load.

The invention is based on the idea that, with the general load and/or level of interference in a network permitting, individual mobile subscribers can be offered, when necessary, better than standard service.

The method of the invention defines network interference load e.g. on the basis of the load of the network cells and/or the level of interference measured at base stations and/or the signal quality. Transmission parameters for a connection are set on the basis of the interference load defined. For instance, low interference load enables reducing channel coding of the data transmitted on the radio path, increasing transmission power at a base station and/or in a mobile station or allocating several traffic channels to a mobile station according to the specific needs of each mobile subscriber, without impairing the general service level of the network. Network parameters can also be set during low interference load. For instance, network handover criteria can be set in such a way that the cell coverage is extended.

One advantage in setting service level in this way is that it enables increasing the number of subscribers served when the general level of interference in the network is low.

Another advantage of the method is that transmission errors in high-speed data transmission are avoided because channel coding is not reduced in an environment subject to interference.

A further advantage of the invention is that it allows increasing the signal transmission rate of a mobile station when there are only a few subscribers and the level of interference is low.

In addition, the method of the invention also has the advantage that, with the interference load of a network permitting, a stronger signal and thus a better than standard signal/interference ratio can be offered to individual mobile subscribers.

A further advantage the method of the invention has is that in an environment of low interference level, the number of handovers can be reduced by increasing the size of a cell or cells.

BRIEF DESCRIPTION OF THE DRAWINGS

The invention is now described in more detail with reference to the attached drawings in which.

DETAILED DESCRIPTION OF THE INVENTION

Figure 1:
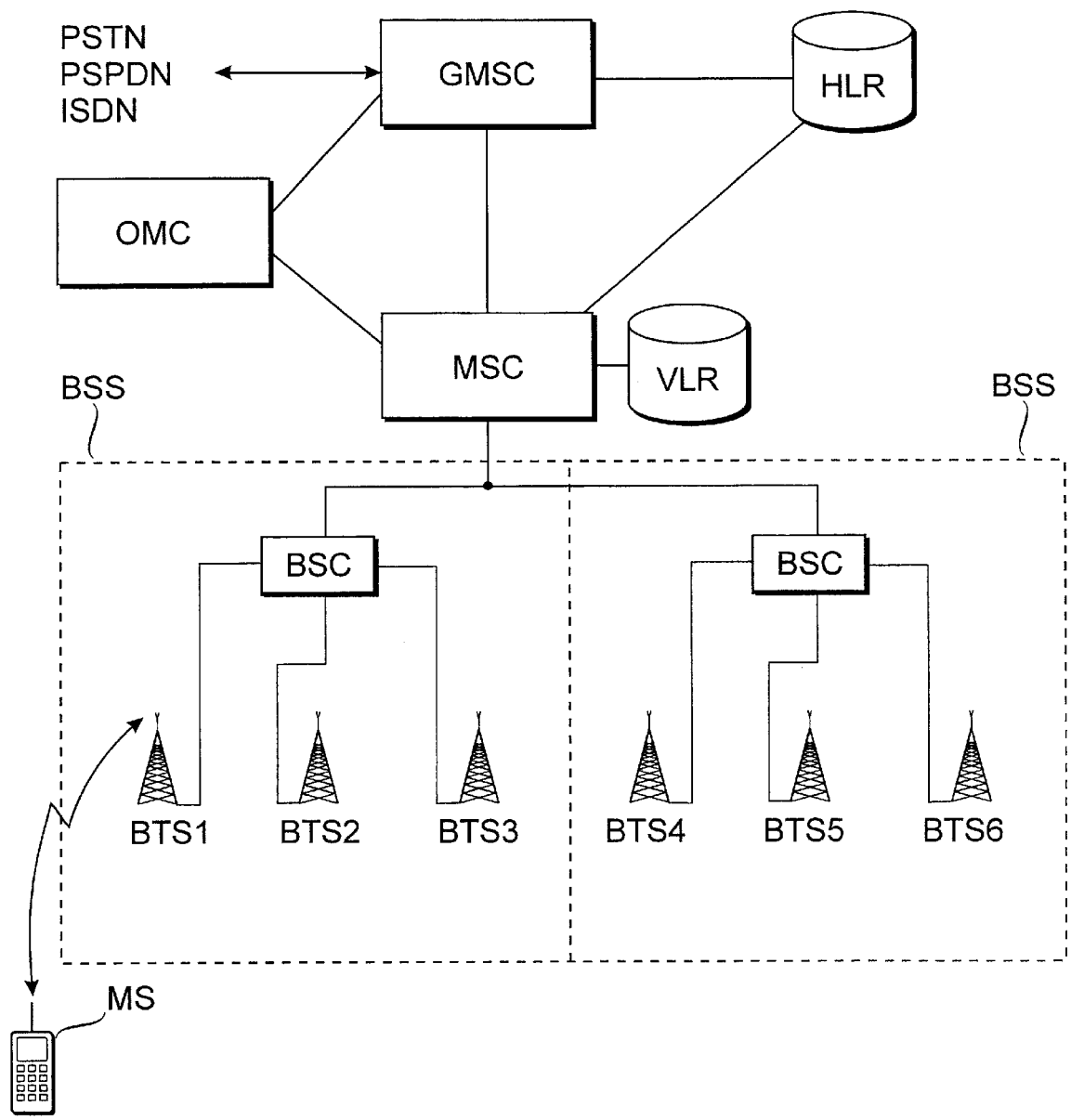
FIG. 1 is a simplified block diagram of a GSM mobile communication system.

The present invention is applicable to any digital mobile communication system. It is particularly suitable for use in mobile communication system implemented by means of a multiple access modulation technique, such as TDMA, CDMA or FDMA (Frequency Division Multiple Access). The invention is described below in more detail by way of an example, mainly in connection with a Pan-European digital GSM mobile communication system of a TDMA type. FIG. 1 illustrates the simplified GSM network structure describe above. As regards a more detailed description of the GSM system, reference is made to GSM recommendations and to "The GSM System for Mobile Communications" by M. Mouly & M. Pautet, Palaiseau, France, 1992, ISBN:2-9507190-0-7.

Figure 2:
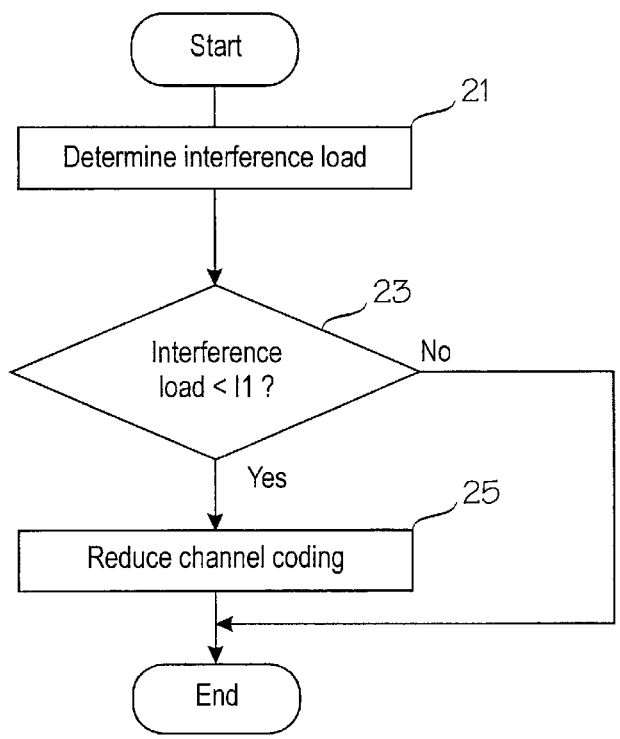
FIG. 2 shows an embodiment of the invention as a flow chart.

FIG. 2 illustrates an embodiment of the method of the invention as a flow chart. In this embodiment network interference load is defined on the basis of the interference level measured at each base station BTS (block 21). The base station BTS measures the level of interference on all traffic channels of said base station, and on the basis of this measurement the interference load of the cell in question is defined, for instance by integrating the interference levels of individual traffic channels or by selecting the highest measured interference level as the interference load value for the cell. The interference load value of an individual cell can then be used as a local value for the network interference level, or the network interference load is defined on the basis of the cell interference load values, for instance by appropriately integrating or combining such values. In block 23 the interference load value thus defined is compared with a threshold value I1 which can be set by the operator. When the interference load remains below the threshold value I1, the base station BTS reduces channel coding on the connection and sends the mobile station MS a control message for reducing channel coding (block 25). The threshold value is preferably set in such a way that the reduction of channel coding does not essentially increase errors in transmission. Reducing channel coding releases transmission capacity on the radio channel for other network operations. The transmission capacity released is preferably used for new base station connections of the mobile subscribers, which allows the network to serve more subscribers.

The above embodiment describes the setting of a service level in the case of a single threshold value I1. If several channel coding levels can be selected, each level can be given a threshold value In of its own, which allows flexible adjustment of the transmission capacity allocated to each mobile station. In this case the load value is compared with all the threshold values I1, . . . , In set and, in response to the triggering of a threshold value, channel coding in a transmission is changed to a channel coding level corresponding to said threshold value. One of the levels corresponds preferably to complete deletion of channel coding.

In a second embodiment of the invention network interference load is defined as given in connection with the embodiment described above, on the basis of the interference measurements performed at base stations. The interference load is compared with the threshold value I1 set by the operator, as described above. When the interference load remains below the threshold value I1, transmission power is increased at the base station BTS and/or in the mobile station MS on the traffic channel reserved for the radio connection in question. In the case of several different threshold values I1, . . . , In, transmission power is changed in response to the triggering of a threshold value In to correspond to the transmission power value defined for the threshold value.

Figure 5:
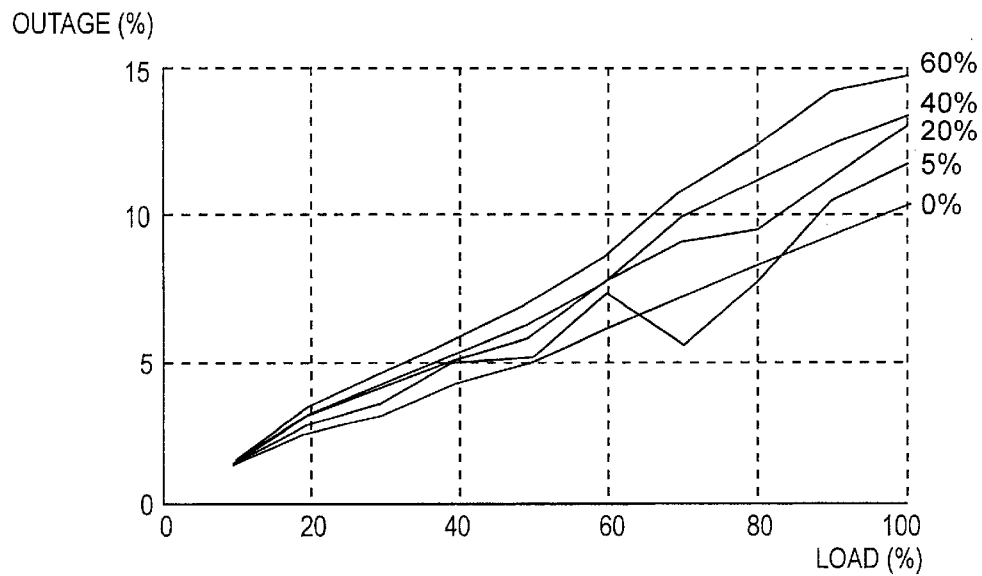
FIG. 5 shows an example of power increase planning.

FIG. 5 illustrates an example of the effect of a 6 dB power increase on the probability of an outage in the network. An outage probability of 10% is considered a normal network planning criterion. The curves in FIG. 5 represent the proportion of subscribers receiving increased capacity to all subscribers. The horizontal axis shows the degree of the network load in comparison with a full load. For instance, a network load of 70% allows offering increased capacity to up to 40% of the subscribers, without the outage probability exceeding 10%.

Figure 3:
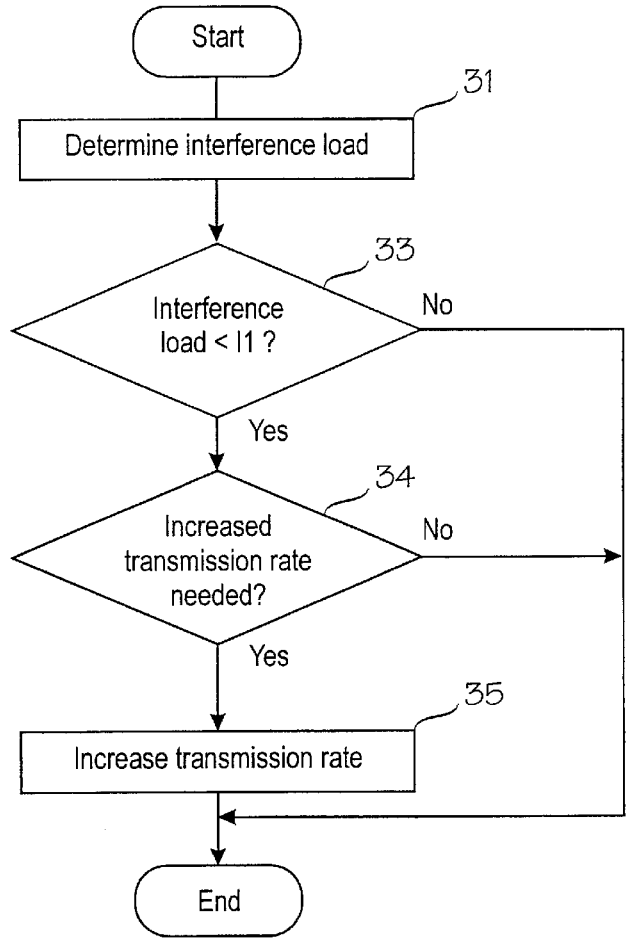
FIG. 3 shows a third embodiment of the invention as a flow chart.

FIG. 3 illustrates a third embodiment of the method of the invention as a flow chart. In the third embodiment network interference load is defined on the basis of cell load. The proportion of traffic channels in use in each cell to the total number of traffic channels in the cell concerned, i.e. the degree of use of traffic channels in a cell (block 31), is being monitored in the mobile communication network. The network interference load is defined on the basis of the cell load in the same way as in the embodiments described above. In block 33, the interference load is compared with a threshold value T1 determined in advance by the operator. In the example given in FIG. 3, when the interference load remains below the threshold value T1, a base station BTS allocates to a mobile stations when necessary, several traffic channels for rapid signal transmission. Whether the operation is desirable for optimal data transmission by a mobile station MS is checked in block 34. If the mobile station MS has, for instance in connection with call set-up, notified that it wishes to apply faster transmission rate than normally, the operation proceeds in FIG. 3 from block 34 to block 35 and a command is sent to the mobile station MS for increasing the transmission rate by dividing the transmission between several traffic channels. When necessary, several threshold values Tn may be applied, in which case in response to triggering different threshold values a number of traffic channels equaling to the number defined for the threshold value triggered is allocated to the mobile station MS,.

In a fourth embodiment of the invention, interference load is defined similarly as above, either on the basis of the degree of cell load, the results of interference measurement performed at base stations, or suitable combinations of load and interference measurement results. As in connection with the embodiments described above, the interference load is compared with the threshold value set. If the interference load has been defined on the basis of both cell loads and interference measurements, the interference load can be given for instance two threshold values and monitored so as to remain below the combination of these values. When the interference load is below the threshold value set, the handover criteria of the network are modified in such a way that the cell coverage becomes larger. If the general network interference load is sufficiently low and the coverage areas of several cells are therefore enlarged by applying a handover criterion setting, the number of handovers performed in the network are reduced, which saves signalling capacity in the network and reduces the risk of losing calls.

Figure 4:
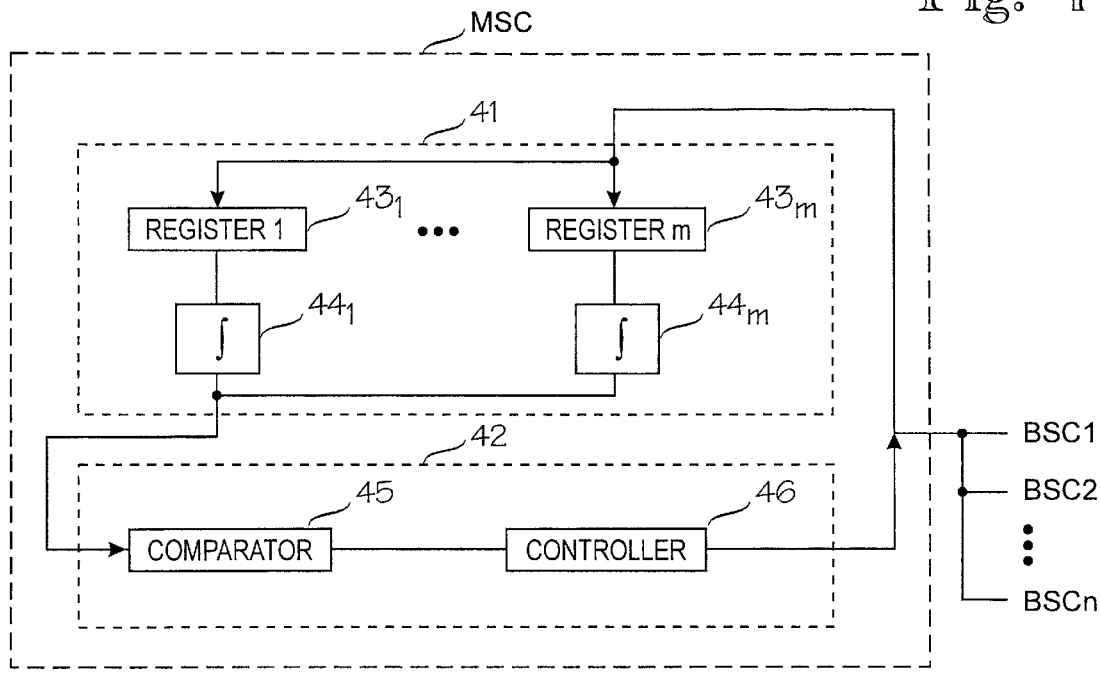
FIG. 4 shows a block diagram of a mobile switching centre MSC for a mobile communication system according to the invention.

In order to implement the method of the invention, means as given in FIG. 4 are arranged within a mobile communication system, preferably in a mobile services switching centre MSC or in connection with a base station controller BSC. FIG. 4 illustrates a mobile services switching centre MSC conforming to the first embodiment of the invention as a block diagram, showing only the components of the mobile services switching centre that are essential to the invention. The mobile services switching centre MSC in FIG. 4 comprises means 41 for defining interference load and means 42 for defining transmission parameters for a connection. Means 41 comprise e.g. in FIG. 4 registers $43_1$, . . . ,$43_m$ for storing interference measurement results received from base stations BSC1, . . . , BCSn, and integrators $44_1$, . . . ,$44_m$ for processing said measurement results. From the output of means 41, a signal indicating the network disturbance load is routed to means 42 where comparator 45 compares the interference load value with the threshold value set in advance. The signal obtained as a result of the comparison is transmitted to controller 46 which defines suitable transmission parameters on the basis of the output of comparator 45 and provides base station controllers BSC1, . . . , BCSm with instructions for the set values of the transmission parameters. For instance, when the output signal of comparator 45 indicates that the interference load remains below the threshold value I1, controller 46 determines that channel coding can be reduced for instance to half the normal. The other transmission parameters are kept normal. Controller 46 sends this information to base station controller BSC1 for further transmission to base station BTS1 and, via base station BTS1, to a mobile station MS. When necessary, means 42 can also comprise several comparators and controllers.

In addition to what is described in FIG. 4, a mobile communication system according to the invention comprises means for setting transmission parameters at a base station (BTS) and means for setting transmission parameters in a mobile station (MS), said means being responsive to the output of controller 46. These means are preferably located at the base station (BTS) and in the mobile station (MS).

In all the embodiments described above interference load can also be defined in another, more suitable way. For instance, an embodiment of the invention can be implemented in a way which otherwise corresponds to the embodiment described first, except that the interference load is defined on the basis of the degree of cell loads, or on the basis of both the interference measurements and the degree of cell loads. It is also possible to define the interference load by measuring the signal quality of the traffic channels at each base station BTS, in addition to the interference level measurement or instead of it. Signal quality can be measured for instance as a Bit Error Rate (BER) measurement. For instance, suitable averaging of the BER results measured allows defining the network interference load.

The drawings and the related description are only meant to illustrate the idea behind the invention. The details of a method of the invention for setting a service level may vary within the scope of the claims. Although the above description of the invention mainly concerns setting individual factors having an effect on the quality of service, several different parameters can be set on the basis of the interference load, for instance by suitably combining the embodiments described above. Interference load can also be defined for instance on the basis of observations of interference load made over a longer time period.

What is claimed is:

1. A method for setting a service level in a digital mobile communication network comprising:

determining a general network interference load, comparing the network interference load at least with one predetermined threshold value, and setting, in connection with the establishment of a connection, transmission parameters at a base station and/or in a mobile station according to the network interference load, said setting including:

reducing channel coding in the transmission of a mobile station and a base station in order to increase the number of channels available when the network interference load remains below a certain threshold value.

2. The method according to claim 1, wherein the network interference load is determined by determining the degree of load in each cell, and determining the interference load in a cell on the basis of the degree of load on said cell and its neighboring cells.

3. The method according to claims 1, wherein the network interference load is determined by measuring the level of interference on the traffic channels and/or the signal quality at each base station, and determining the interference load in an individual cell on the basis of the measurements performed by the base station of the cell in question.

4. The method according to claim 1, comprising steps of comparing the network interference load with at least one predetermined threshold value, and increasing the transmission rate at a base station and/or in a mobile station in order to improve the signal-interference ratio of the connection when the interference load remains below a certain threshold value.

5. The method according to claim 4, comprising steps of setting several threshold values for the interference load and, in response to load values remaining below each threshold value or a combination of threshold values, setting transmission parameters at a base station and in a mobile station, when necessary, to a parameter value predetermined for each threshold value of a combination of threshold values.

6. The method according to claim 1, comprising steps of comparing the network interference load with at least one predetermined threshold value, and allocating several traffic channels to a mobile station in order to increase the signal transmission rate when the interference load remains below a certain threshold value.

7. A digital mobile communication system, comprising means for determining a network interference load, and means for setting network parameters in response to the network interference load, said means for setting including means for comparing the network interference load at least with one predetermined threshold value, and means for reducing channel coding in the transmission of a mobile station and a base station in order to increase the number of channels available when the interference load remains below a certain threshold value.

\* \* \* \* \*